July 6, 1937.  E. C. JUERGENS  2,086,036
GASOLINE ELECTRIC POWER MECHANISM
Filed Sept. 28, 1935  4 Sheets-Sheet 1
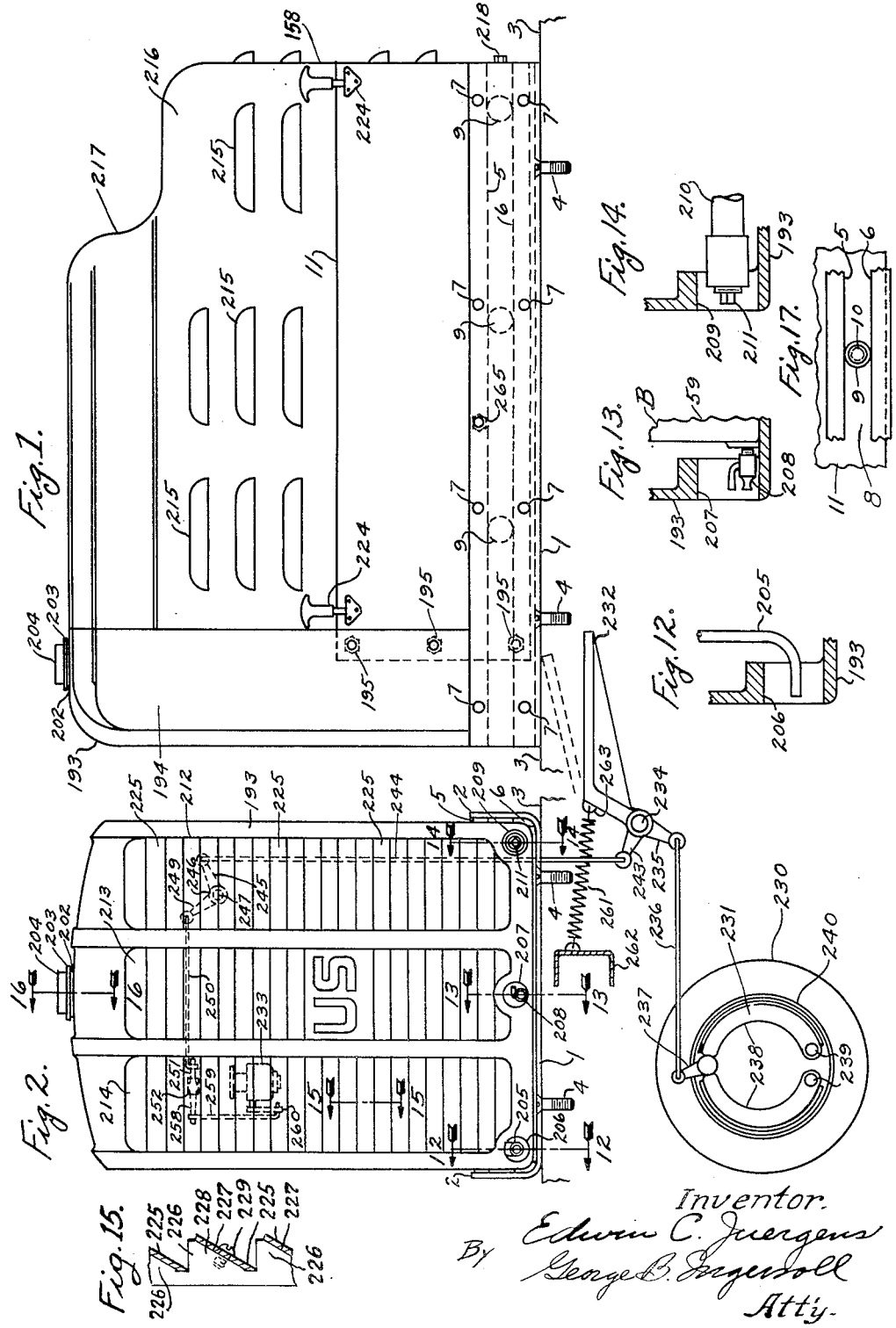
Inventor.
Edwin C. Juergens
By George B. Ingersoll
Atty.

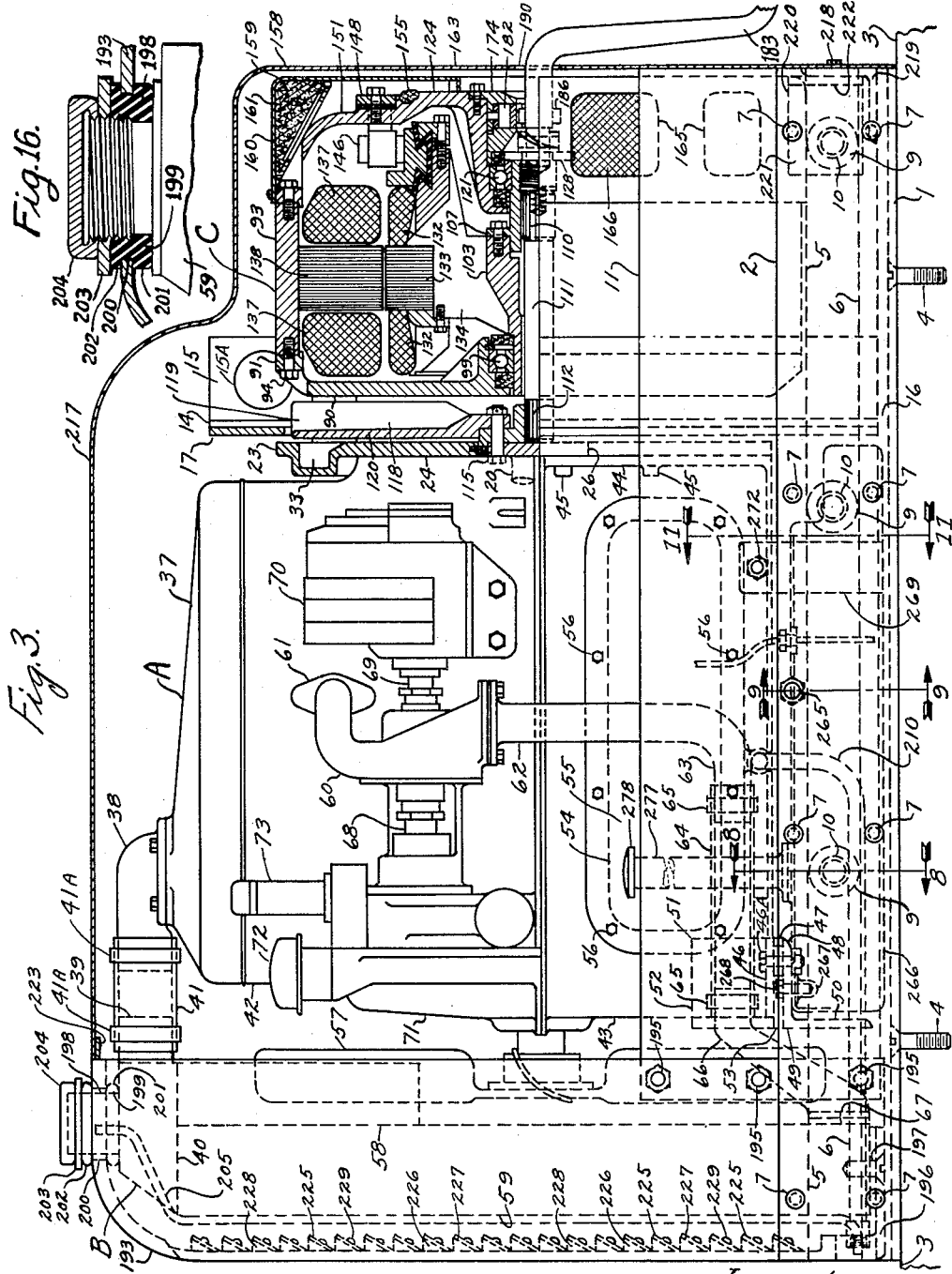

July 6, 1937.  E. C. JUERGENS  2,086,036
GASOLINE ELECTRIC POWER MECHANISM
Filed Sept. 28, 1935   4 Sheets-Sheet 3
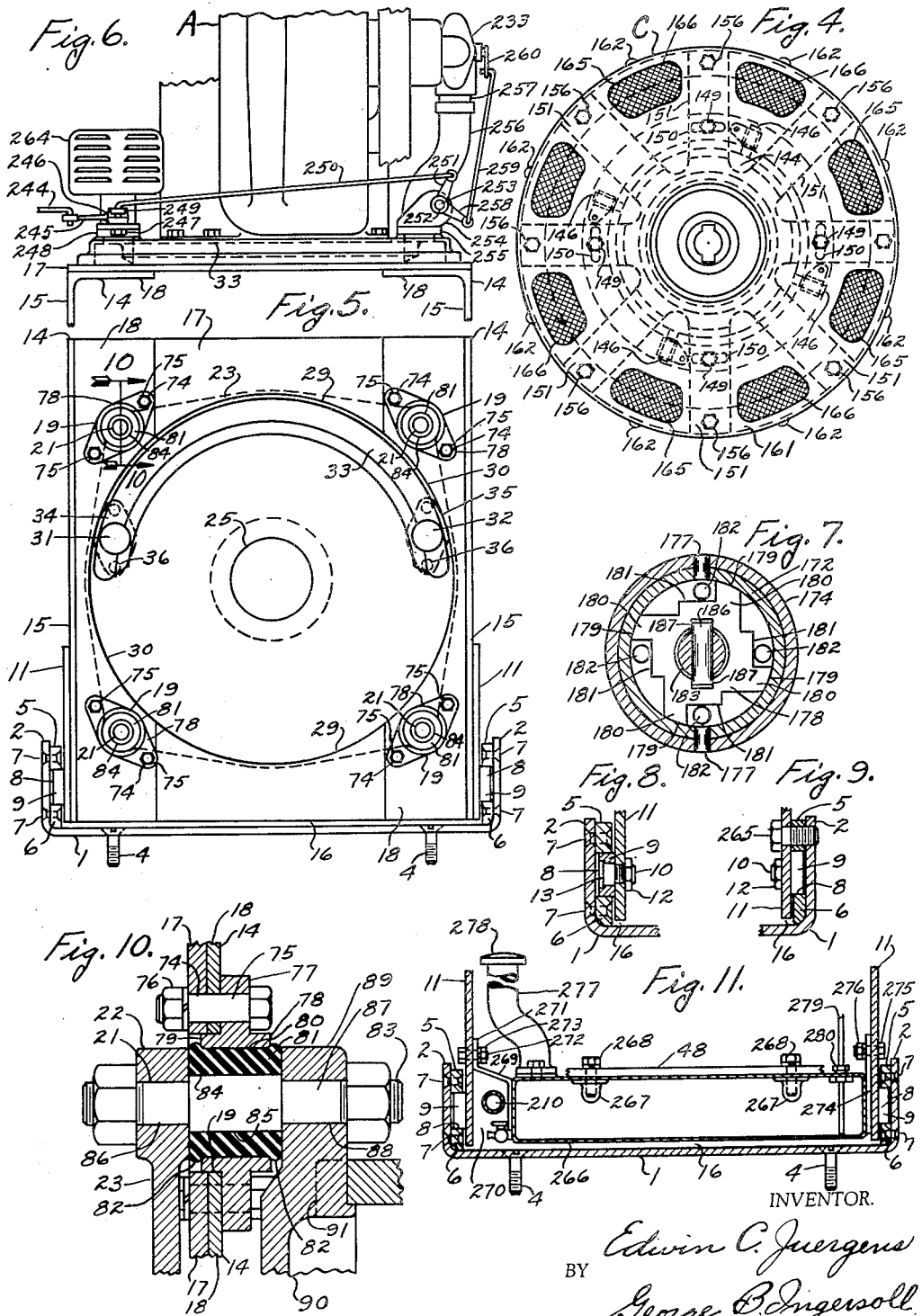
INVENTOR.
Edwin C. Juergens
BY George B. Ingersoll
ATTORNEY.

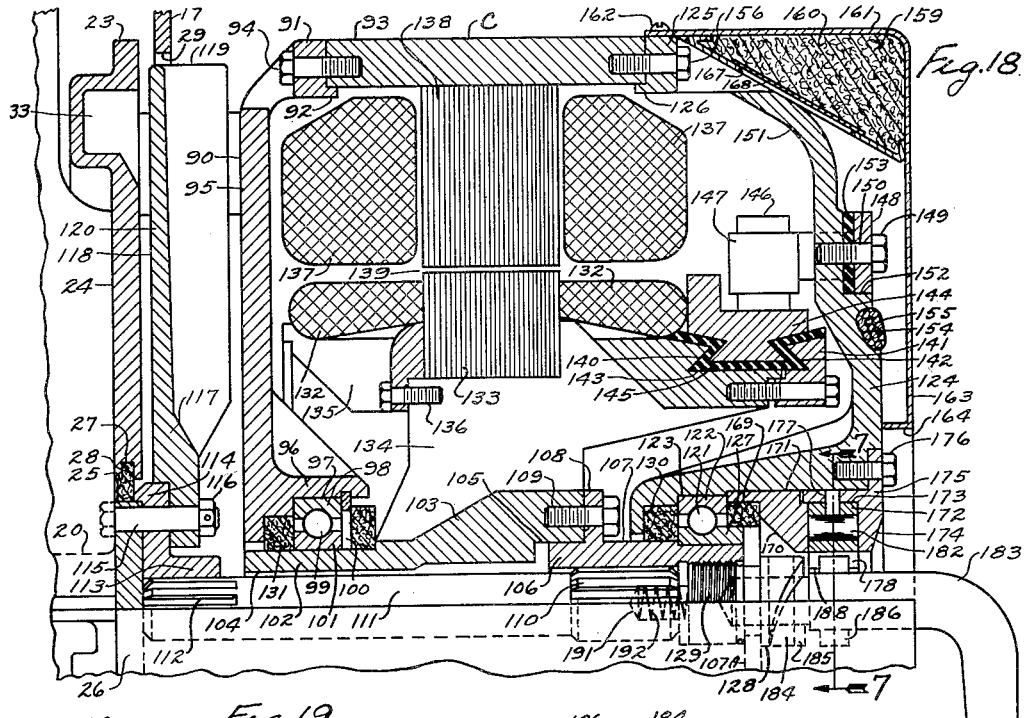

Patented July 6, 1937

2,086,036

UNITED STATES PATENT OFFICE 2,086,036

GASOLINE ELECTRIC POWER MECHANISM

Edwin C. Juergens, Detroit, Mich.

Application September 28, 1935, Serial No. 42,643

20 Claims. (Cl. 290—1)

My invention relates to improvements in gasoline electric power mechanisms for utilization as a power unit for industrial trucks, tractors, and similar industrial installations requiring power developing units or assemblies, and the objects of my invention are, first, to provide a gasoline electric power mechanism having an electric generator installed as a self-contained and separate unit driven by a gasoline engine to provide greater efficiency in both the gasoline engine and the electric generator and especially in the electric generator which results in greater electric flux and with an electric generator of relatively small diameter or size; second, to provide a gasoline electric power mechanism having a gasoline engine assembly with a resilient mounting and readily removable from an assembled position relative to an electric generator assembly; third, to provide an electric generator assembly with a resilient mounting and readily removable from an assembled position relative to a gasoline engine assembly; fourth, to provide a gasoline electric power mechanism with means for rollably removing it from its frame support mechanism; fifth, to provide a gasoline electric power mechanism with means for drawing air into a gasoline engine assembly through an electric generator mechanism; sixth, to provide a gasoline electric power mechanism with an air cleaning mechanism mounted in an electric generator mechanism; seventh, to provide a gasoline electric power mechanism having an electric generator mechanism with a cooling fan; eighth, to provide a gasoline electric power mechanism with a sub-frame provided with tracks for engaging roller members mounted on a frame mechanism for supporting the gasoline electric power mechanism; ninth, to provide a power mechanism with a centrifugal air cleaner mechanism; tenth, to provide an electric generator mechanism with a readily removable brush assembly; eleventh, to provide an engine assembly with throttle control means operatively connected with brake mechanism of a unit or vehicle equipped with the engine assembly to enable the engine assembly to be maintained in idle operation when the brake mechanism is in a locked or set position relative to the unit or vehicle; twelfth, to provide means whereby a gasoline engine assembly may drive an electric generator assembly, comprising parts constructed of cast material, with hardened parts constructed of alloy steel or similar hardened parts; thirteenth, to provide a safety starting device for a gasoline engine assembly; fourteenth, to provide a starting crank assembly for an engine and comprising a free wheeling or overrunning mechanism; fifteenth, to provide a starting crank assembly comprising a pair of driving pins, one of said driving pins being adapted to engage a starting crank nut or ratchet while the other of the driving pins is adapted to engage a free wheeling or overrunning mechanism; sixteenth, to provide a gasoline electric power mechanism in which air is drawn into said mechanism at each of its ends by a gasoline engine assembly; seventeenth, to provide a gasoline electric power mechanism having a fuel tank mounted below a gasoline engine assembly and removably supported with said power mechanism as an integral part of the power mechanism; eighteenth, to provide a radiator assembly for a gasoline engine provided with openings therethrough for receiving oil and water connections therein; nineteenth, to provide a radiator assembly for a gasoline engine assembly and provided with means whereby oil and water may be drained from the engine assembly at the front side of the radiator assembly; and twentieth, to provide a radiator housing constructed of cast material and provided with louver openings formed by bar or plate members, constructed of strip metal or similar material, secured to the radiator housing.

I attain these objects by the mechanism illustrated in the accompanying drawings, in which—

Figure 1 is an outside side elevation of the gasoline electric power mechanism as it appears when enclosed in its housing mechanism; Fig. 2, a front elevation of the mechanism disclosed in Fig. 1, said Fig. 2 further diagrammatically disclosing mechanism for operatively connecting a carburetor of the engine assembly with a brake mechanism of a truck chassis which is equipped with the gasoline electric power mechanisms; Fig. 3, a side elevation of the gasoline electric power mechanism installed in its housing mechanism and with a portion of the housing mechanism removed to better disclose the gasoline engine and electric generator mechanism, said Fig. 3 further disclosing a partial sectional view of the electric generator mechanism and starting crank mechanism taken in a vertical plane extending through the axis of the crankshaft of the gasoline engine assembly and through the axis of the electric generator assembly; Fig. 4, an end view of the electric generator and its air cleaner mechanism; Fig. 5, a rear end view of the frame support mechanism together with portions of the gasoline engine assembly supported therein and with the electric generator mechanism removed therefrom; Fig. 6, a partial plan view of the gasoline engine mechanism disclosed in Fig. 5 and without the frame support mechanism; Fig. 7, a sectional view of the starting crank mechanism, taken on the line 7—7, Fig. 18, and with the starting crank disclosed therein; Fig. 8, a partial sectional view through the roller and track mechanism taken on the line 8—8, Fig. 3; Fig. 9, a partial sectional view through one of the anchoring bolts for locking the rollably mounted and fixed frame mechanisms together, said sectional view being taken on the line 9—9, Fig. 3; Fig. 10, a sectional view through one of the resilient support mechanisms for the gasoline engine and electric generator mechanisms, said sectional view being taken on the line 10—10, Fig. 5; Fig. 11, a sectional view through the gasoline tank and its support mechanism, said sectional view being taken on the line 11—11, Fig. 3; Fig. 12, a partial sectional view of the radiator overflow pipe taken on the line 12—12, Fig. 2; Fig. 13, a partial sectional view of the radiator drain mechanism taken on the line 13—13, Fig. 2; Fig. 14, a partial sectional view of the oil drain mechanism taken on the line 14—14, Fig. 2; Fig. 15, a partial sectional view of the radiator grill construction taken on the line 15—15, Fig. 2; Fig. 16, a partial sectional view of the radiator filler mechanism taken on the line 16—16, Fig. 2; Fig. 17, a partial side view of one of the rollers engaging the track member of the frame support mechanism; Fig. 18, a partial sectional view of the electric generator and starting crank mechanisms as disclosed in Fig. 3 but drawn to a larger scale to facilitate and clarify the disclosure thereof; Fig. 19, an end view of the engine assembly and its flywheel fan together with the supporting housing for supporting the electric generator mechanism but without the electric generator mechanism; Fig. 20, a side elevation of the frame assembly which is rollably mounted on the subframe member; Fig. 21, a side view of the starting crank assembly; Fig. 22, an end view of the starting crank assembly disclosed in Fig. 21; Fig. 23, a side view of the starting crank nut; and Fig. 24, an end view of the starting crank nut disclosed in Fig. 23.

Similar numerals refer to similar parts throughout the several views.

The gasoline electric power unit comprises the engine assembly A, the radiator assembly B, and the electric generator assembly C, as disclosed in the assembly of the unit in Fig. 3.

The subframe member 1 is constructed with a U shape having an open upper side together with the flanges 2 at each of its sides and extending substantially for the length of the power mechanism unit assembly.

The subframe member 1 is suitably secured to the platform or supporting portion 3 of industrial trucks or similar vehicles and units with which my gasoline electric power unit mechanism is equipped by means of the screws 4, as disclosed in Fig. 1. The upper rail members 5, together with the lower rail members 6 are secured to the flanges 2 by the rivets 7, the upper and lower rail members 5 and 6 thus providing a track or channel 8 therebetween at the inner sides of said flange members 2 and in which rollably operate the rollers or wheels 9, the rollers 9 being rotatably mounted on the studs 10 which extend through suitable holes or openings in the plates 11, the studs 10 being secured by the nuts 12, the studs 10 being further provided if desired with the shouldered end portion 13 which extends within a suitable shouldered portion in each of the rollers 9 to rotatably retain them on the studs 10 and against axial movement on the studs 10, this construction being disclosed in detail in Figs. 8, 9 and 11.

The angle irons 14 are of right angle construction, each having one of its flanges 15 suitably secured to one of the plates 11 as by welding or by similar means and extends downwardly to substantially the bottom edges of the plates 11, as disclosed in Figs. 5 and 20, the plates 11 and the angle members 14 thus having their lower edge surfaces supported a slight distance above the inside surface of the U shaped portion of the subframe 1 to provide the clearance space 16 therebetween to avoid interference when the plates 11 and the angle members 14, together with their supported mechanisms as hereinafter described, are rollably moved longitudinally of the subframe 1, the flanges 15 being provided with the holes 15A to facilitate hoisting thereof by power apparatus.

The rollers 9 are made of special width so that their outer end surfaces are located with a slight clearance space relative to the inside surface of the flanges 2, said clearance space between the inside surface of said flanges 2 and the outer end surfaces of the rollers 9 being substantially the same as the clearance space between the outside surfaces of the plates 11 and the inside surfaces of the rail members 5 and 6, thus providing ample operating clearance for the rollable movement of the plates 11 and their supported mechanism within and between the flanges 2 of the subframe 1, as disclosed in Fig. 11.

The plate member 17 is suitably secured to the flanges 18 at the forward side of the angle members 14 as by welding or similar means and thus provides means for fixedly supporting the angle members 14, as disclosed in Figs. 5 and 10.

The holes or openings 19 are suitably located relative to the center or axis of the crank shaft 20 of the engine assembly A so as to coincide with and be in alignment with the holes or openings 21 of the bosses 22 of the housing 23 which is suitably secured to the rear end surface 24 of the engine assembly A, as disclosed in Figs. 3, 6 and 18, said housing 23 thus being secured to the engine assembly A in a manner similar to that in which a conventional flywheel housing is mounted on a conventional engine assembly for use in motor vehicles by suitable studs or screws extending through the housing 23 and into a series of holes arranged around the end surface 24 of the engine assembly A.

The housing 23 will be provided with a bore 25 extending therethrough and which fits around and engages the outside diameter of the flange 26 of the crank shaft 20, the bore 25 of the housing 23 being provided with the recess 27 extending angularly therearound and which permits the packing material 28 to be assembled therein and to engage the outside surface of the flange 26 of the crank shaft 20. The plate 17 is provided with the hole or bore 29 therethrough and also each of the flanges 18 of the angle members 14 are provided with the cut-out portion 30 to coincide with the diameter of the bore 29 through the plate member 17.

The housing 23 is provided with the holes or openings 31 and 32 which connect with the groove or channel 33 which extends substantially concentrically around approximately the upper half of the rear face of the housing 23 and between the holes 31 and 32 to provide a channel or groove for the passage of air therealong as is more fully described hereinafter.

The housing 23 is provided with the boss portion 34 at its forward side adjacent and extended around the opening 31, said housing 23 being further provided with the boss portion 35 at its forward side adjacent and surrounding the opening 32.

The boss portions 34 and 35 are provided with the tapped holes 36 for facilitating the securement of a pair of housings for connection thereto as more fully hereinafter described. The gasoline engine assembly A may be provided with any desired number and arrangement of cylinders and is disclosed as comprising the cylinder head cover 37 to which is suitably secured the water outlet connection 38 which is connected to the water inlet connection 39 of the upper tank 40 of the radiator assembly B, by means of the rubber conduit 41 secured respectively to the water inlet connection 39 and the water outlet connection 38 by the clamp members 41A, as disclosed in Fig. 3.

The gasoline engine assembly A further comprises the cylinder and crank case housing 42 which rotatably supports the crank shaft 20 in a conventional manner, the lower side of the cylinder and crank case housing 42 being supported by the oil pan housing 43 which is of cast metal construction to provide the necessary rigidity for securement to the housing 23, said oil pan housing 43 being provided with the flange 44 at its rear end together with the boss portions 45 to facilitate the securement of the oil pan housing to the housing 23 at the rear end of the engine assembly A.

The oil pan housing 43 is further provided with the boss portions 46 at each side and adjacent its forward end, the boss portions 46 being adapted to rest upon the rubber blocks or members 47 which in turn rest upon and are supported by the upper surface of the flange 48 of the angle iron 49, said boss portions 46 being secured by the bolts 46A, the angle iron 49 being provided with the vertically extending flange 50, said angle iron 49 extending between the plates 11 and being secured thereto by the angle or bracket members 51 which are each provided with the vertically extending flange 52 for securement to the inside surfaces of the plate members 11 as by welding or similar means, as disclosed in Fig. 3, said angle members 51 being further provided with the horizontal extending flange 53 which is suitably secured to the upper surface of the angle iron 49 as by welding, bolting or similar means.

It is to be noted that the oil pan housing 43 is provided with a relatively large hand hole or opening 54 which is closed by the plate or cover 55 which is secured to the oil pan housing by the screws 56, the hand opening 54 permitting the ready removal and replacement of such parts as connecting rods, pistons, rings, etc., as comprised by the gasoline engine assembly A in a few minutes time, and thus providing accessibility for servicing operations on the gasoline engine assembly A, this construction being best disclosed in Fig. 3.

The gasoline engine assembly A is further provided with the fan assembly 57, as disclosed in Figs. 3, 18 and 19, which has the forward edges of its blade portions located adjacent the rear side 58 of the radiator core assembly 59 of the radiator assembly B, the fan assembly 57 thus being operatively driven conventionally by driving portions of the gasoline engine assembly A.

The gasoline engine assembly A, as disclosed in Fig. 3 is further provided with a water pump assembly 60 which is suitably mounted thereon and connected at its upper end by the flange connection 61 to the water passages of the cylinder and crank case housing 42 and at its lower side to the water pipe or housing 62, the pipe or water pump connection 62 being provided at its lower side with the forwardly extending portion 63 over which fits the rubber hose 64, the rubber hose 64 being connected to the end of the forwardly extending portion 63 by a hose clamp 65, the rubber hose 64 being further connected at its forward end to the water connection 66 which is suitably secured to the lower water tank portion 67 of the radiator assembly B, the rubber hose 64 being secured to the water connection 66 by one of the hose clamps 65.

The water pump shaft 68 is suitably mounted and operatively driven by driving portions of the gasoline engine assembly A to operate a conventional impeller mechanism in the water pump assembly 60, the water pump shaft 68 being operatively connected with and adapted to drive the drive shaft 69 of the magneto assembly 70 which is suitably supported on and adjacent the side of the cylinder and crank case housing 42.

The housing 71 is suitably mounted on and suitably connects with the upper surface of the oil pan housing 43 and extends upwardly a sufficient distance to position the oil filler cap 72 in an accessible position.

The cylinder crank case housing 42 may be provided with the oil filler assembly 73 which is connected by suitable passages with the interior of the gasoline engine assembly A and also provides breathing characteristics for the gasoline engine assembly A.

It will now readily be seen that the gasoline engine assembly A is supported at its front end on the rubber blocks 47 which are in turn supported by portions of the frame assembly and the rear mounting or support for the rear end of the gasoline engine assembly A will now be described, said rear mounting means being disclosed in Figs. 5, 10 and 19.

The holes or openings 74 are provided adjacent the openings 19 and extend through the flanges 18 of the angle iron members 14 and also through the plate member 17 and are adapted to receive the bolts 75 which extend therethrough and are secured by the nuts 76, the bolts 75 extending through suitable openings in the flanges 77 of the brackets 78, the brackets 78 each being provided with a pilot portion 79 which extends and fits within the openings 19.

The brackets 78 are each provided with the bore 80 in which is mounted the resilient bushing 81 which is constructed of rubber or similar material and which has a diameter of sufficient size to compress the bushing 81 when assembled therein, and to cause the ends of the bushing 81 to form the shoulder portion 82 at each of its ends for extending around and in engagement with the end surfaces of the main boss portion of the brackets 78 and to form means for absorbing thrust reactions longitudinally of the stud 83 which is assembled therein and therethrough, the bushing 81 being provided with openings 84 therethrough for fixedly receiving the shouldered portion 85 of the studs 83 therein as by vulcanizing or similar means.

The studs 83 are each provided with the shoulder portion 86 which extends through the openings 21 in the housing member 23, the studs 83 being further provided with the shoulder portion 87 which extends through the holes or openings 88 in the boss portions 89 of the supporting housing 90.

It is now to be noted that the gasoline engine assembly A is supported resiliently at its rear end by the bushings 81, by the plate member 17 and the angle members 14 of the frame mechanism, said gasoline engine assembly A being supported at its front end as hereinbefore described by the angle iron 49 to which is secured the oil pan housing 43 and by the rubber blocks 47 interposed between the oil pan housing 43 and the angle iron 49.

The gasoline engine assembly A thus will be resiliently supported at its front and rear ends by the frame mechanism, as disclosed in Figs. 3, 8, 9, 11 and 20.

The supporting housing 90 is also resiliently supported by the bushings 81 and is provided with a ring portion 91 extending therearound, the ring portion 91 extending therearound being provided with a pilot portion 92 for locating the annular or ring member 93 which forms the field magnet of the electric generator assembly C, the ring member 93 having its bore fitting over the pilot portion 92 of the housing 90 and being secured thereto by a plurality of screws 94 extending through suitable holes or openings of the ring portion 91 of the housing 90. The housing 90 is provided with the plurality of rib members 95 for connecting the ring portion 91 with the boss portion 96, the boss portion 96 being provided with the bore 97 for receiving the outer race member 98 of the bearing assembly 99 therein, as disclosed in Figs. 3 and 18.

The outer race 98 of the bearing assembly 99 is retained by the snap ring 100 which engages the end surface of the outer race member 98 and a suitable groove extending annularly around the bore 97.

The inner race member 101 of the bearing assembly 99 is supported on the extension portion 102 of the armature core 103, as clearly disclosed in Fig. 18, which is provided with a bore 104 extending therethrough together with the pilot bore 105 for receiving the pilot portion 106 of the hub member 107 which is provided with the flange 108 which is secured to the end of the armature core 103 by a plurality of screws 109. The hub member 107 is provided with splines for receiving the splined end 110 of the drive shaft 111 which is also provided with the spline portion 112 at its front end for engaging the splined portion of the driving hub 113 which is provided with the pilot portion 114 extending over the outside diameter of the flange 26 of the crank shaft 20, the driving hub 113 being secured to the flange 26 of the crank shaft 20 by the bolts 115 and the nuts 116, as disclosed in Fig. 18.

The bolts 115 also extend through the hub portion 117 of the flywheel fan 118 which is provided with a plurality of blade portions 119 connected by the web or flange 120 extending around the front side of the flywheel fan 118.

It is now to be observed that the flywheel fan 118 will be revolvably mounted with its flange or web portion 120 extending adjacent the rear side of the air passage or channel 33, as disclosed in Fig. 18.

Also it is to be noted that the crank shaft 20 and the flange 26 thereof will drive the drive shaft 111 which will in turn drive the hub member 106 which will in turn drive the armature core 103 together with its supporting mechanism hereinafter described, the armature core 103 being supported at its front end in the bearing assembly 99 which is supported in the fixed support housing 90, the armature core 103 together with the hub 106 being supported at its rear end in the bearing assembly 121 which has its outer race 122 mounted in the bore 123 of the support housing 124 which is also provided with the ring portion 125 having the pilot portion 126 which fits within the bore of the ring member 93 and is secured thereto by the screws 156, the support housing 124 together with the ring member 93 thus being fixedly supported by the support housing 90.

The inner race 127 of the bearing assembly 121 is secured on the outside diameter of the hub member 106 by the washer or shoulder 107a of the starting crank nut 128 which is provided with the threaded portion 129 for threadably engaging the threaded end of the hub member 106, as disclosed in Figs. 3 and 18.

The sealing member assembly 130 will be mounted in a bore of the supporting housing 124 between its front end and the bearing assembly 121.

Also the sealing member assembly 131 will be suitably mounted in a bore of the supporting housing 90 between its front side and the bearing assembly 99, as disclosed in Figs. 3 and 18.

The armature core 103 is provided with the windings 132 wound around the stack portion 133 which is secured around the plurality of ribs 134 around the armature core 103, the stack portion 133 being secured by one or more clamp brackets or housings 135 which are secured to the ribs 134 by the screws 136.

The ring member 93 is provided with the electrical windings 137 suitably secured to the ring member 93 and wound around the stack portion 138 which is suitably secured to the ring member 93. The stack portion 138 is separated from the stack portion 133 by the air gap 139, the armature core 103 being provided with the dovetail portion 140 extending therearound, which together with one or more of the clamp brackets 141, provided with a similar dovetail portion 142, provides an undercut groove 143 extending around the rear end of the generator assembly C as disclosed in Figs. 3 and 18, and provides means for holding therein the plurality of segments 144 which are provided with a suitable dovetail shape at their bases for being located in the dovetail groove 143, the segments 144 being separated by the insulation 145 from the armature core 103 and the brackets 141, thus forming a commutator mechanism which is electrically connected with the windings 132 and stack portion 133, the commutator mechanism being designed to receive electrical current therethrough from the source of power in the electric generator assembly C in which the electric motor force is generated, the commutator mechanism delivering the current to a plurality of brush members 146 which are suitably supported and insulated in the bracket members 147 which are secured to the ring member 148 by the screws 149, the ring member 148 being provided with the elongated slots or grooves 150 to permit adjustably shifting the position of the brushes 146 relative to the ring member 148, the ring member 148, together with the brackets 147 and their supporting brushes 146 being thus readily removable by removing the screws 149, the brackets 147 and the brushes 146 extending between the ribs or arms 151 of the support housing 124, as disclosed in Figs. 4 and 18. The support housing 124 is provided with the cylindrical surface 152 over which the bore of the ring member 148 fits to locate it axially in alignment with the supporting housing 124. The ring 148 will be insulated from the support housing 124 by the insulation 153.

The housing 124 will be provided with the grooves 154, as being disclosed in Fig. 18, extending therearound and in which is assembled the cable 155 which is suitably connected with the brushes 146 and to a conventional electric motor assembly suitably located on the industrial truck or unit 3 with which my gasoline engine assembly is equipped, the electric motor assembly (not disclosed) being electrically and suitably connected with the driving wheels of the industrial tractor, truck, or unit, one of said driving wheels being disclosed in Fig. 2.

The support housing 124 is provided with a space between its arms 151 and the rear wall portion 158 of the housing enclosure or hood assembly 217 and which will be more fully described hereinafter, to permit the air strainer or cleaner material 159, which has a triangular shaped cross section and comprises suitable straining or cleaning material such as steel wool, fibre, felt or similar material, which is supported within the chamber 160, as disclosed in Figs. 3 and 18, said strainer or cleaner material 159 extending circumferentially around said housing 161.

The housing 161 may extend around the ring like portion 125 of the support housing 124 and may be secured thereto by a plurality of screws 162.

The housing 161 may be provided with the wall portion 163 which extends between and adjacent the end portions of the support housing 124 and the wall portion 158 of the hood assembly 217, the wall portion 163 being provided with an annular flange portion 164 for contacting the end surface of the support housing 124 to close the housing 161 at its inner side, the housing 161 being further provided with a plurality of openings 165 which may be suitably covered by a mesh structure such as screen or similar material 166 as disclosed in Fig. 4, to retain the cleaner or strainer material 159 and to provide an entrance for air into and through the cleaner or strainer material 159 and through suitable openings 167 on the inner side of the housing 161, said openings 167 being suitably covered by a wire mesh screen or material 168 which is similar to the wire mesh or screen material 166.

The sealing member assembly 169 is mounted adjacent the bearing assembly 121 and in a bore of the retainer member 170 which fits within a bore 171 of the support housing 124, as disclosed in Figs. 3 and 18. The retainer 170 is retained in position by the outer bearing race 172 which is secured in the bore 173 of the retainer member 174 which is provided with the flange 175 which is secured to the outer end of the support housing 124 by the screws 176, the outer bearing race 172 being secured against rotation in the bore 173 of the retainer 174 by the pin 177.

The cam member 178 is provided with the cylindrical surface 179 at the outer sides of its arms 180 for movably engaging the inner bore of the outer race member 172, thus positioning the cam member 178 concentrically with the drive shaft 111 and the electric generator assembly C.

The cam member 178 is further provided with the notch or shoulder portions 181 which retain the roller members 182, as disclosed in Fig. 7, in a position where they will rollably engage the shoulder portion 181 and the inside bore of the outer race member 172.

The rollers 182 are normally held between the shoulder portion 181 and the inner bore of the race member 172 with a slight clearance between the roller members 182 and the inner bore of the race member 172 so that a portion of the generator assembly may rotate together with the cam member 178 by permitting the rollers 182 to form a non-engaging or operative connection with the cam member 178 and the race member 172 except when the starting crank 183, together with its driving pin 184 is inserted between the jaws 185 of the starting crank nut 128, disclosed in detail in Figs. 23 and 24, the jaws 185 each being provided with a cylindrical surface to fit the driving pin 184, together with the grooves or slots therebetween to permit the entrance of the driving pin 184 to its driving position within the starting crank jaw 185.

Also at the same time the driving pin 186 which is fixedly mounted in the starting crank 183, as disclosed in Figs. 7, 21 and 22, will enter and engage the slots 187 of the cam member 178, the starting crank 183 being assembled through the bore 188 of the cam member 178 and also through the opening 190 of the wall portion 158 of the hood assembly 217.

The starting crank 183 is provided with the handle portion 189 which may be revolvably mounted therein.

It will thus be seen that with the starting crank 183, assembled in the position as disclosed in Figs. 3 and 18, that the operator by grasping the handle portion 189 and turning the crank 183 can turn the motor by means of the starting crank nut 128 which is fixedly secured to the electric generator assembly C, as hereinbefore described, and by turning the starting crank 183 in a clockwise direction, as viewed in Fig. 7, with a resultant clockwise movement of the cam member 178, the roller members 182 will be carried around with the cam member 178 and allow the gasoline engine assembly to be cranked in its starting operation. However, if the gasoline engine assembly A should back fire or kick, the roller members 182 will immediately be slightly moved in an anti-clockwise rotative movement, as viewed in Fig. 7, about the axis of and between the cam member 178 and the outer race member 172, the roller members 182 immediately being locked in a driving engagement between the inner bore of the outer race member 172 and the shoulder portions 181 of the cam member 178, thus arresting or stopping any tendency of the cam member 178, together with the starting crank 183, to be revolved backwardly or in an anti-clockwise direction.

The anti-clockwise movement of the jaws 185 of the starting crank nut 128, due to the kicking or reversing of the gasoline engine assembly A, will immediately force the starting crank 183 longitudinally and outwardly so that the driving pins 184 will be moved out of driving engagement with the starting crank jaws 185, the driving pin 186 also being moved by the longitudinal or axial movement of the starting crank 183 out of engagement with the slots 187, thus providing a safety cranking device which prevents injuries to the operator when cranking the engine, from backfiring or kicking in the starting operation.

The drive shaft 111 will be provided with the bore 191 in which is assembled the spring or resilient member 192, as disclosed in Figs. 3 and 18, which is thus interposed between the driving shaft 111 and the starting crank nut 128 to urge the drive shaft 111 toward and in contact with the flange 26 of the crank shaft 20, thus eliminating any tendency or looseness or rattling in the operation of the drive shaft 111.

It is to be here noted that the armature core 103, as disclosed in Figs. 3 and 18, may be constructed of cast material and in my invention is adapted to be driven by means of the hub member 106 which is secured thereto, the hub member 106 being made of alloy steel, or similar high grade and hardened material, which together with the driving shaft 111, which also can be made of alloy steel, or similar high grade hardened material, thus provides driving means for the generator assembly C through hardened alloy steel or similar material and yet permits the construction of the armature core 103 and other portions of its supported mechanism from cast material, thus providing a drive mechanism having especially long life and at the same time permitting economical construction of the electric generator assembly C and its parts.

The radiator shell 193, as disclosed in Figs. 2 and 3, is provided with the side flanges 194 which are secured to the plate members 11 by the screws 195.

The radiator core assembly 59 is mounted on and secured to the bottom wall 196 of the radiator shell 193 by the screws 197.

The radiator core assembly 59 is provided with the filler neck 198, as disclosed in Fig. 16, which extends through the opening in the resilient or rubber bushing 199, which in turn extends through the opening 200 in the upper flange of the radiator shell 193.

The resilient or rubber bushing 199 is constructed of sufficiently large size so that when entered and extended through the opening 200 of the radiator shell 193 it will bulge around and form shoulder portions 201 and 202 at the upper and lower sides adjacent the opening 200 of the radiator shell 193 to position the filler neck 198 substantially centrally with the opening 200 to thus further position and locate the upper portion of the radiator core assembly 59. The washer member 203 is provided with an opening so that it may be assembled over and around the filler neck 198 and will be compressed against the upper side of the rubber bushing 199 by means of the filler cap 204 which threadably engages the filler neck 198 and closes the filler opening thereto.

The radiator core assembly 59 is provided with the overflow tube 205 which extends from within the filler neck 198 downwardly and into the opening 206 at the left hand lower front of the radiator assembly B to flow outwardly and downwardly through the opening 206 of the radiator shell 193, as disclosed in Figs. 2 and 12.

The radiator shell 193 is also provided with the opening 207 located substantially centrally at the lower side thereof and is adapted to receive thereinto the drain cock 208 which is connected with the lower water tank of the radiator core assembly 59 of the radiator core assembly B, thus providing means for draining the water from the radiator core assembly 59 into and through the opening 207 in the front side of the radiator shell 193, as disclosed in Figs. 2 and 13.

In a similar way the radiator shell 193 is provided with the opening 209 at its lower right hand portion as viewed in Fig. 2, and into which extends the oil drain tube 210 which is suitably connected with the oil pan housing 43 and which is provided with a pipe or drain plug 211 at its front end, thus enabling the oil from the oil pan housing 43 of the gasoline engine assembly A to drain into and through the opening 209 from the radiator shell 193, as disclosed in Fig. 14.

The radiator shell 193 is provided with the large openings 212, 213 and 214, as disclosed in Fig. 2, through its front wall which form air openings therethrough and which permit the fan assembly 57 to draw air into and through the radiator shell 193 and through the radiator core assembly 59, the air being forced out of the enclosure for the gasoline engine assembly A through the louvers 215 in the side portions 216 of the hood assembly 217 which forms the enclosing housing for the gasoline engine assembly A and is provided with the wall portion 158 which may be suitably secured at its bottom portion by the screws 218 to the angle iron 219 which may extend across between and connect the plates 11 at their rear ends, the angle iron 219 being suitably secured at its ends by the bracket 220 which has its flange 221 suitably secured to the inside of the plates 11 as by welding, or similar means, and its flange 222 suitably secured to the upright flange of the angle iron 219 as by welding or similar means.

The enclosure housing formed by the hood assembly 217 may be supported at its front edge on the ledge portion 223 which may be formed as an integral portion with the radiator shell 193.

Also the sides of the hood assembly 217 are secured at their lower sides to the plate members 11 by the hood latch assemblies 224, as disclosed in Fig. 1.

The openings 212, 213 and 214 of the radiator shell 193 are partially closed by the plates or bar members 225 which may be arranged to extend outwardly and downwardly relative to the front end surface of the radiator shell 193 to form louvers or openings 226 therebetween, the plate or bar members 225 being secured to the angular surfaces 227 of the lugs 228 by the screws 229, as disclosed in Figs. 1 and 15.

It is thus to be noted that by providing the bars or plates 225 which may be made of strip steel or plate and secured to the lug portions 228 of the radiator shell 193, I have eliminated a very expensive and complicated casting operation which would be necessary if the louver openings 226 were to be provided in the radiator shell 193 by casting them therein.

The industrial truck, tractor or unit with which my gasoline engine assembly A is equipped and which will be provided with the portion 3 to which the gasoline engine assembly A is mounted, will enable the tractor, truck, or similar unit, which is provided with wheels 230, one of which is disclosed in Fig. 2 to have the brake mechanism 231 which is manually operated by the pedal 232, to be interconnected and operatively connected with the carburetor assembly 233, the pedal 232 being pivotally mounted on the shaft 234 and being provided with the arm 235 which is pivotally connected to the rod 236 which is pivotally connected with the crank or lever 237 which operates the brake shoes of the brake shoe assemblies 238, the brake shoe assemblies 238 being pivoted on the shafts 239 and adapted to contact the brake drum 240.

Also the brake pedal 232 is provided with the arm or lever 243 which is pivotally connected to the rod 244 which is pivotally connected to the arm 245 of the bell crank 246 which is suitably mounted on the bracket or connection 248, the bracket 248 being provided with a suitable passage therethrough for connecting with the passage or channel 33 of the housing 23.

The bell crank 246, as disclosed in Figs. 2 and 6, is provided with the lever or arm 249 which is pivotally connected with the rod 250 which extends across the gasoline engine assembly A and is pivotally connected to the lever arm 251 of the crank 252 which is pivotally mounted on the shaft 253 which is suitably supported in the lug 254 of the bracket 255 which is constructed with a suitable passage for connecting with the opening 32 and the air channel or passage 33 of the housing 23.

The bracket or housing 255 is connected by the tubular member 256 with the air intake 257 of the carburetor assembly 233.

The bell crank 252 is provided with the lever arm 258 pivotally connected to the rod 259, which in turn is pivotally connected with the throttle lever 260 which operates a conventional throttle or butter-fly in the carburetor assembly 233.

It is thus to be noted that when the pedal 232, as disclosed in Fig. 2, is operated by the driver of the vehicle to set or lock the brake shoes of the brake assemblies 238, the operative parts, above described will further operate the throttle of the carburetor assembly 233 to a position in which the gasoline engine assembly A will be maintained in an idling operation whenever the brake assemblies 238 is operated to its braking or locked position to impede or stop the movement of the industrial truck or tractor with which my gasoline engine assembly A is equipped.

The spring or resilient member 261 will be suitably anchored to the frame side rail 262 of the industrial truck or unit and also to the boss 263 of the pedal 232 to always tend to move the pedal 232 upwardly about the shaft 234 to set or lock the brakes immediately the driver or operator removes his foot from the pedal 232 and to further automatically operate the carburetor 233 for controlling or maintaining an idling operation of the gasoline engine assembly A whenever the brakes are set in the industrial truck tractor, etc.

In some instances it may be desired to install an air cleaner 264, as disclosed in Fig. 6, in connection with one of the openings 31 as disclosed in Fig. 6 and to thus place the air cleaner 264 in connection with the air passage 33 of the housing 23 and when this is desired the air cleaner 264 may be suitably mounted on the bracket 248 as disclosed in Fig. 6.

The plates 11, together with their supported rollers or members 9 may be locked and maintained against movement relative to the sub-frame 1 by one or more lock screws 265 which may extend through the plates 11 through the tracks 5 and threadably engage the upright flanges 2 of the sub-frame 1.

The gasoline tank 266, disclosed in Figs. 3 and 11, is mounted below the oil pan housing 43 of the gasoline engine assembly A and also below the angle iron 49.

The gasoline tank 266 is provided with the lugs 267 on its inside and which are adapted to be engaged by and receive the screws 268 which extend through the flange 48 of the angle iron 49 and thus support the gasoline tank 266 at its forward end, the rear end of the gasoline tank 266 being supported by the bracket 269 which is suitably secured to the side of the gasoline tank as by soldering, welding or similar means and is provided with a bent portion to provide a clearance space or chamber 270 between one side of the gasoline tank 266 and one of the plate members 11, the bracket 269 being provided with the flange 271 which is secured to one of the plates 11 by the bolt 272 and nut 273.

The clearance space or chamber 270 thus permits the extension of the oil drain tube 210 therethrough from the oil pan housing 43 through and into the opening 209 of the radiator shell 193.

The gasoline tank 266 is supported at its opposite side by the plate 274 which is suitably secured to the side of the gasoline tank as by soldering, welding or similar means and is secured to one of the plate members 11 by the bolt 275 and the nut 276.

The gasoline tank 266 is provided with an inlet or connection member 277 which extends upwardly sufficiently to position its cap or cover member 278 adjacent the cap or cover member 72 of the oil filler mechanism of the gasoline engine assembly A, the inlet connection 278 being disclosed as being broken off in Figs. 3 and 11.

The tubular conduit member 279 is suitably connected to the gasoline tank assembly 266 by the connection 280, the end of the tubular conduit 279 extending to a point adjacent the lower wall portion of the gasoline tank 266, the tubular conduit 279 being suitably extended and connected to the carburetor assembly 233, thus providing means whereby the gasoline or fuel carried in the tank 266 is drawn or sucked into the carburetor assembly 233 and thus provide the fuel requirements for the gasoline engine assembly A.

In operation the gasoline engine assembly A is started by the starting crank 183 and its driving pin 184 engaging the starting crank jaws 185 of the starting crank nut 128 which thus tends to revolve the hub member 106 which in turn will drive the drive shaft 111 to drive the flange 113 which is fixedly secured to the flange 26 of the crank shaft 20.

The pin 186 of the starting crank 183 engages the cam member 178 which allows the roller members 182 to revolve with the cam member 178 in normal and safe starting operation of the gasoline engine assembly A. However, should the motor kick or back fire the reversing movement of the gasoline engine assembly A, together with the starting crank 183, will tend to turn the cam member 178 backward but this would be prevented by the rollers 182 locking and forming a driving engagement between the outer race member 172 and the cam member 178, thus restricting the starting crank from being rotated backwardly due to said back firing or kicking of the gasoline engine assembly A, the outer race member 172 being fixedly mounted in the support housing 124.

Also the starting crank jaws 185 by their angular end surfaces will tend to immediately move the starting crank 183 longitudinally out of engagement with the starting crank jaws 185 and the cam member 178 as soon as the gasoline engine assembly picks up and is operated under its own power.

As soon as the gasoline engine assembly A is revolved and operated under its own power, the armature core 103, together with its wirings 132 and the stack portion 133 will revolve therewith, the armature core 103 also causing the segments 144 to revolve therewith.

The revolving operation of the armature core 103 and its supported windings and parts are in electrical association with the wirings 137 and stack portion 138, which are supported on the ring member 93, and develop and generate electromotive forces which by suitable wiring will be conducted to the segment members 144 where the electromotive force or currents will be collected by the brush members 146 and carried to the cable 155, said currents thus being distributed to the electric motor assembly suitably mounted on the industrial truck or unit 3 and driving the driving wheels 230 to propel the truck or unit 3.

As the generator assembly C revolves, air will be drawn through the openings 165 and the screens 166 and through the strainer or cleaner material 159 and through the screen members 168 and the openings 167 and between the ribs or arms 151 of the supporting housing 124 and through the electric generator assembly free and clear from dirt, etc., and causing flowage of air through the air channel 33 and through one of the openings 32 and through the bracket 255 and through the tubular member 256 to the carburetor 233.

Also as the air is drawn in this way by the flywheel fan 118 any dirt that should be contained by the air passing through the generator assembly C will be thrown centrifugally outwardly by the flywheel fan 118 beyond the air channel or passage 33 of the support housing 23 and thus provide a second or auxiliary means whereby dirt will be separated from the incoming air which is travelling on its way to the carburetor assembly 233.

Also the operation of pulling the air through the generator assembly C will result in a much cooler and efficient operation of the electric generator assembly C and also a more efficient operation of the gasoline engine assembly A, the operating temperatures of both the generator assembly C and the gasoline engine assembly A being maintained at proper temperature and conditions for most favorable operating conditions in constant service.

The cooling water of the gasoline engine assembly A is forced upwardly through the connection 38 and through rubber hose 41 and the water connection 39 to the radiator core assembly B where it flows downwardly through the core assembly 59 past the louvers 226 through which the air is being drawn by the fan 57, the air flowing through the passages of the core assembly 59 into the interior of the enclosure housing or hood assembly 217 and outwardly along the louvers or openings 215 in its side portions, thus mingling with the air which is being drawn in and thrown centrifugally outwardly by the flywheel fan 118, thus providing a pair of means for maintaining cool operation of both the generator assembly C and the gasoline engine assembly A, the cooling water from the cooler 59 returning to the gasoline engine assembly A through the connections 66, the hose 64 and the water connection 62 to the water pump 60.

When it is desired to service or remove any of the operating parts of the electric generator assembly C or the gasoline engine assembly A, or if it is desired to remove either of the gasoline engine or electric generator assemblies, the hood assembly or enclosure housing 217 is readily removed by removing the screws 218 from the rear wall portion 158 of the enclosure housing or hood assembly 217, after which the hood latches 224 may be disconnected from the side portions of the hood assembly 217 and after this the hood assembly 217 may be readily removed.

The operator now removes the lock screws 265 and disconnects the rubber hoses 64 and 41 respectively at the upper and lower portions of the gasoline engine assembly A after which the complete and remaining portion of the gasoline engine assembly A, together with the electric generator assembly C may be rollably moved along the tracks 5 and 6 by means of the rollers 9, thus allowing the complete gasoline engine assembly A and the generator assembly C to be moved out from the sub-frame 1.

The removal of the nuts on the rear ends of the studs 83 will allow the housing 90, together with its supported portions of the electric generator assembly C to be readily removed.

Also the removal of the nuts at the front ends of the studs 83, together with the bolts 46A extending through the bosses of the oil pan housing 43 readily allows the gasoline engine assembly A to be dismounted from its supported position on the frame mechanism.

I claim:

1. In a gasoline electric power mechanism, the combination of a subframe provided with track members, a frame assembly provided with rollers adapted to run on said track members of said subframe, a lock member for maintaining said frame assembly against movement relative to said subframe, a gasoline engine resiliently mounted on said frame assembly and provided with a housing having an air channel therein, said gasoline engine assembly being further provided with a carburetor having an air connection communicating with said air channel, a flywheel fan member mounted on and driven by said gasoline engine assembly, said flywheel fan member being located adjacent said air channel, an electric generator assembly supported in said frame assembly and driven by said gasoline engine assembly, an air cleaner means mounted on one end of said electric generator assembly, said flywheel fan member being adapted to draw air through said air cleaner means and through said electric generator assembly to points adjacent said air channel, a starting crank assembly mounted in said electric generator assembly and adapted to start said gasoline engine assembly, a radiator assembly mounted on said subframe adjacent one end of said gasoline engine assembly and connected with said gasoline engine assembly, and a hood assembly mounted on said radiator and said frame assemblies and enclosing said gasoline engine and said electric generator assemblies.

2. In a gasoline electric power mechanism, the combination of a frame assembly provided with an upright portion together with side members connected by cross members adjacent its ends, resilient bushings supported by said upright portion of said frame assembly, stud members mounted in and extending through said resilient bushings, an engine assembly mounted on the ends of said stud members, said engine assembly being further supported on one of said cross members of said frame assembly, and an electric generator assembly mounted on the other ends of said stud members, roller members mounted on said side members of said frame assembly, and a subframe provided with track members and engaged by said roller members of said frame assembly.

3. In a gasoline electric power mechanism, the combination of a subframe, a radiator assembly fixedly supported on said subframe, a frame assembly rollably mounted on said subframe, and gasoline engine and electric generator mechanism mounted on said frame assembly, said gasoline engine being provided with water passages connected with said radiator assembly.

4. In a gasoline electric power mechanism, the combination of a frame assembly rollably mounted, a power mechanism comprising a gasoline engine together with electric generator mechanisms mounted on said frame assembly, said gasoline engine being provided with a carburetor, a fuel tank mounted under said gasoline engine, said fuel tank being connected with said carburetor of said gasoline engine, and means for supporting said fuel tank from said frame assembly.

5. In a gasoline electric power mechanism, the combination of an engine assembly provided with a rigid oil pan housing having boss portions at its lower front side together with a housing at the rear end of said engine assembly, said rigid oil pan housing being provided with a hand hole in its side, means resiliently connected with said housing at the rear side of and for supporting the rear end of said engine assembly, a second means resiliently connected with said boss portions of said oil pan housing of and for supporting the front end of said engine assembly, and electric generator mechanism resiliently supported on said first mentioned means.

6. In a gasoline electric power mechanism, the combination of a frame assembly provided with an upright flange having an opening therethrough, an engine assembly provided with a housing at its rear end and having an air channel provided with an open side adjacent said opening of said upright flange of said frame assembly, said housing being secured to said upright flange of said frame assembly, said engine assembly being provided with a carburetor mechanism, a flywheel fan mounted on said engine assembly and adjacent the open side of said air channel of said housing of said engine assembly, a second housing supported on said upright flange of said frame assembly, an annular field magnet member fixedly mounted on said second housing and provided with magnet windings, a third housing fixedly mounted on said annular field magnet member, bearing assemblies mounted in said second and said third housings, an armature member rotatably mounted within said magnet windings and in said bearing assemblies and provided with armature windings, a hub member mounted on said third housing, a drive shaft connected between said engine assembly and said hub member, a brush assembly mounted on said third housing and provided with brush members engaging said armature member, and conduit means connecting said carburetor mechanism and said air channel of said housing of said engine assembly.

7. In a gasoline electric power mechanism, the combination of an engine assembly provided with a pair of fan members together with a carburetor, an electric generator mechanism mounted adjacent said engine assembly and driven thereby, an air cleaner mounted on and at the rear end of said electric generator assembly, a subframe, a radiator assembly mounted on said subframe, a frame assembly rollably mounted on said subframe and supporting said engine assembly and said electric generator mechanism, a hood assembly mounted on said radiator assembly and said frame assembly, said hood assembly enclosing said engine assembly and said electric generator mechanism, said hood assembly being provided with openings in its side portions and in its end portion adjacent said air cleaner, one of said fan members of said engine assembly drawing air through said radiator assembly into said hood assembly and expelling it out of said openings in the side portions of said hood assembly, the other of said fan members of said engine assembly drawing air through said openings in the end portion of said hood assembly and through said air cleaner and said electric generator mechanism, and means for conducting a portion of the air drawn through said air cleaner and said electric generator mechanism to said carburetor of said engine assembly.

8. In a gasoline electric power mechanism, the combination of a sub-frame, a frame assembly rollably mounted on said sub-frame, a power mechanism comprising a gasoline engine together with an electric generator mechanism, said power mechanism being supported on said frame assembly, and a fuel tank located under said power mechanism and supported by said frame assembly.

9. In a gasoline electric power mechanism, the combination of a frame support means provided with an upright portion, resilient members supported by said upright portion of said frame support means, stud members mounted in said resilient members, an engine assembly supported on said stud members, at one side of said upright portion of said frame support means, and an electric generator assembly supported on said stud members at the opposite side of said upright portion of said frame support means and driven by said engine assembly.

10. In a gasoline electric power mechanism, the combination of a frame support means provided with a flange, an engine assembly, an electric generator assembly, resilient means for supporting said engine and said electric generator assemblies on said flange of said frame support means, and means operatively connecting said engine and said electric generator assemblies to form a driving connection therebetween.

11. In a gasoline electric power mechanism, the combination of frame support means provided with a flange, an engine assembly, an electric generator assembly, resilient means for supporting said engine and said electric generator assemblies on said flange of said frame support means, means operatively connecting said engine and said electric generator assemblies to form a driving connection therebetween, a sub-frame, and means for rollably supporting said frame support means on said sub-frame.

12. In a gasoline electric power mechanism, the combination of a frame assembly provided with a flange structure, brackets mounted on said flange structure of said frame assembly, bushings of rubber or similar composition mounted in said brackets, studs mounted in said bushings, an engine assembly mounted on said studs, and an electric generator assembly mounted on said studs and operatively connected with said engine assembly.

13. In a gasoline electric generator mechanism, the combination of a sub-frame, a frame assembly rollably mounted on said sub-frame and having an upright structure provided with an opening for connecting with a hoist means, an engine assembly supported by said upright structure, and an electric generator assembly supported by said upright structure and operatively connected with said engine assembly.

14. In a gasoline electric generator mechanism, the combination of a radiator, a gasoline engine assembly operatively connected with said radiator, an electric generator assembly operatively connected with said engine assembly, and rollably mounted means supporting said engine and said electric generator assemblies to permit said engine and said electric generator assemblies to be rollably removed from said radiator when said radiator and said engine assembly are disconnected.

15. In a gasoline electric power mechanism, the combination of an engine assembly provided with an oil pan having a hole therein to permit accessibility therethrough for service operations, said oil pan being provided with support surfaces, resilient means supporting said engine assembly through said support surfaces of said oil pan, a second resilient means supporting said engine assembly at one end of said oil pan, and an electric generator mechanism resiliently supported adjacent said end of said oil pan and operatively connected with said engine assembly.

16. In a gasoline electric power mechanism, the combination of an engine assembly provided with an oil pan having an opening therein to permit accessibility therethrough for service operations, cover means for said opening of said oil pan, a frame assembly supporting said engine assembly through said oil pan, and an electric generator mechanism supported by said frame assembly and operatively connected with said engine assembly.

17. In a gasoline electric power mechanism, the combination of an engine assembly provided with an engine assembly provided with an oil pan having an opening therein to permit accessibility therethrough for service operations, cover means for said opening of said oil pan, a frame assembly supporting said engine assembly through said oil pan, an electric generator mechanism supported by said frame assembly and operatively connected with said engine assembly, a sub-frame, and means rollably supporting said frame assembly on said sub-frame.

18. In a gasoline electric power mechanism, the combination of an engine assembly, an electric generator assembly provided with armature means rotatably supported thereby, support means for and extending between said engine assembly and said electric generator assembly, shaft means forming a driving connection between said engine and said electric generator assemblies, a sub-frame, and means for rollably supporting said support means on said sub-frame.

19. In a gasoline electric power mechanism, the combination of a frame assembly provided with an upright flange having an opening therethrough, an engine assembly provided with a flange secured to said upright flange, said engine assembly being provided with a carburetor mechanism having an air passage extending through said flange of said engine assembly and connecting with said opening through said upright flange of said frame assembly, a flywheel fan mounted on and driven by said engine assembly, said flywheel fan being located adjacent the flange of said engine assembly and within said opening extending through said upright flange of said frame assembly, and an electric generator assembly supported by said upright flange of said frame assembly and operatively connected with said engine assembly, said electric generator assembly being provided with an air passage extending therethrough and connecting with said opening through said upright flange of said frame assembly.

20. In a gasoline electric power mechansim, the combination of an engine assembly, an electric generator assembly provided with armature means rotatably supported thereby, said electric generator assembly being provided with an air passage therethrough, support means for and extending between said engine assembly and said electric generator mechansim, a fan rotatably mounted between said engine and said electric generator mechanism, conduit means providing an air passage from adjacent said fan to fuel passages of said engine assembly, and a hood assembly provided with air openings in substantial alignment with air expelled outwardly from the periphery of said fan, said hood assembly being further provided with air openings in substantial alignment with the entrance of said air passage of said electric generator mechanism, said hood assembly enclosing said engine assembly and said electric generator mechanism and their operatively connected parts.

EDWIN C. JUERGENS.